United States Patent Office 3,361,767
Patented Jan. 2, 1968

---

3,361,767
10,5(EPOXYMETHANO) - 10,11 - DIHYDRO - 5H-DIBENZO[a,d]CYCLOHEPTEN - 13 - ONE AND DERIVATIVES
Thomas A. Dobson, St. Laurent, Quebec, and Martin A. Davis, Montreal, Quebec, Canada, assignors to American Home Products Corporation, New York, N.Y., a corporation of Delaware
No Drawing. Filed Apr. 4, 1966, Ser. No. 539,640
14 Claims. (Cl. 260—343.2)

This invention relates to novel chemical compounds having useful biological properties and to intermediates used in their preparation. In particular this invention relates to substituted 10,5-(epoxymethano)-10,11-dihydro-5H-dibenzo[a,d]cyclohepten-13-one derivatives of the following generic Formula I

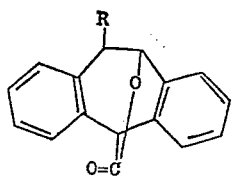

in which R represents hydrogen, halogen, hydroxy, lower alkoxy or acyloxy, such as, for example acetoxy or chloroacetoxy or p-nitrobenzoyloxy or p-aminobenzoyloxy.

The compound of this invention wherein the substituent R represents hydrogen may be prepared according to one of the following general schemes. Thus 5H-dibenzo[a,d]cycloheptene-5-carboxamide of Formula IIa either dissolved or suspended in an inert solvent, preferably chloroform, at a temperature within the range of 0° to 40° C., is treated with one molar proportion of bromine to give 10,11 - dibromo-10,11-dihydro-5H-dibenzo[a,d]cycloheptene-5-carboxamide of Formula III. This compound is, in turn, treated with either boiling water or a boiling alkanol of from one to four carbon atoms such as, for example, ethanol for a period of from one to four hours to give the 11-bromo-10,5-(epoxymethano)-10,11-dihydro-5H-dibenzo[a,d]cyclohepten-13-one of Formula IVa. Alternatively, 5H-dibenzo[a,d]cycloheptene-5-carboxylic acid of Formula IIb is either dissolved or suspended in an inert solvent, preferably chloroform, at a temperature within the range of 0° to 50° C. and treated with one molar equivalent of bromine for a period of up to one day. The inert solvent is then evaporated and the residue is treated with either boiling water or a boiling alkanol, preferably ethanol, for a period of time of from one to four hours to give the 11-bromo-10,5-(epoxymethano)-10,11-dihydro-5H-dibenzo[a,d]cyclohepten-13-one of Formula IV. This compound is, in turn, treated with either aqueous ammonium hydroxide solution at a temperature of from 40° to 80° C. or boiling liquid ammonia to give the 10,11-epoxy - 10,11 - dihydro - 5H-dibenzo[a,d]cycloheptene-5-carboxamide of Formula V. This compound is, in its turn, dissolved in a suitable solvent such as, for example, ethanol, and hydrogenated in the presence of a suitable noble metal catalyst, preferably a 10% suspension of palladium on charcoal, until one molar equivalent of hydrogen is absorbed to give the low melting geometrical isomer of 10-hydroxy - 10,11-dihydro-5H-dibenzo[a,d]cycloheptene-5-carboxamide of Formula VI. This compound is, in turn, treated with a boiling alkanol of from one to four carbon atoms, preferably ethanol, until ammonia evolution is complete to give the desired 10,5-(epoxymethano)-10,11-dihydro-5H-dibenzo[a,d]cyclohepten-13-one of Formula VII.

As an alternative mode of preparation of 10,5-(epoxymethano) - 10,11 - dihydro-5H-dibenzo[a,d]cyclohepten-13-one of Formula VII, a solution of 5H-dibenzo[a,d]cycloheptene-5-carboxamide of Formula IIa in an inert solvent such as, for example, tetrahydrofuran, is reacted at or below room temperature for a period of one to three days with molar excess of diborane. The reaction mixture is then oxidized with a mixture of an aqueous alkali metal hydroxide solution and an aqueous hydrogen peroxide solution, according to common practice, to give the high melting geometrical isomer of 10-hydroxy-10,11-dihydro-5H-dibenzo[a,d]cycloheptene-5-carboxamide of Formula VI. This compound, in its turn, is treated with a hot dilute mineral acid, such as for example 1 N hydrochloric acid, to give as the major product 10,5-(epoxymethano)-10,11-dihydro-5H-dibenzo[a,d]cyclohepten-13-one of Formula VII. The aforementioned conversions are illustrated in the following formulae.

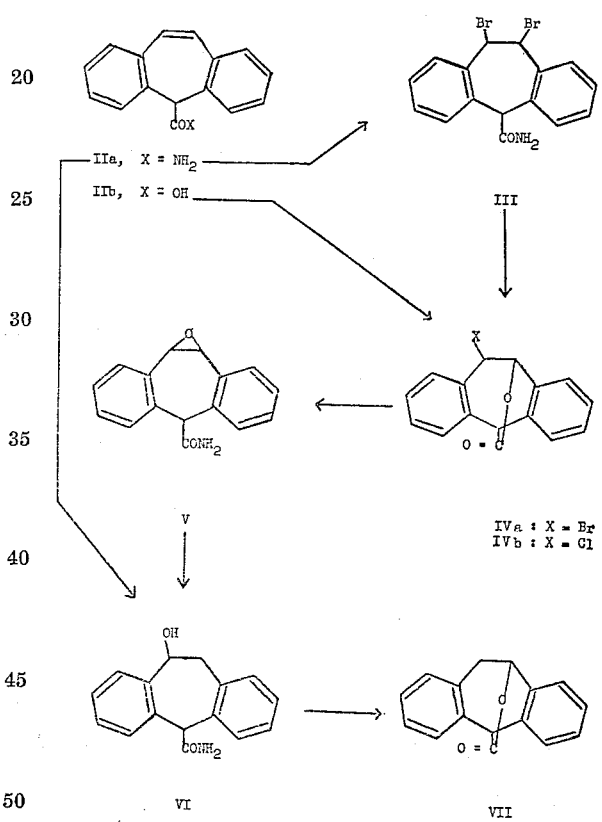

The compounds of generic Formula I wherein R represents hydroxy or acyloxy may be prepared by one of the following general schemes. Thus 5H-dibenzo[a,d]cycloheptene-5-carboxamide of Formula IIa is treated with a mixture of silver acetate, iodine, acetic acid and water according to the method commonly known as the Woodward modification of the Prevost oxidation reaction as described in Advances in Organic Chemistry, vol. I, 1960, pages 118–122, to give, after processing, 11-acetoxy-10,5-(epoxymethano)-10,11 - dihydro - 5H - dibenzo[a,d]cyclohepten-13-one of Formula VIIIa wherein R represents acetoxy. This compound is, in its turn, saponified at or below room temperature with an aqueous or alcoholic solution of an alkali metal hydroxide to give the lower melting geometrical isomer of 11-hydroxy-10,5-(epoxymethano) - 10,11 - dihydro-5H-dibenzo[a,d]cyclohepten-13-one of Formula IX. Alternatively, the 10,11-epoxy-10,11 - dihydro-5H-dibenzo[a,d]cycloheptene-5-carboxamide of Formula V is treated with a dilute mineral acid such as, for example, 1 N sulphuric acid at or below room temperature either in the presence or absence of an inert solvent such as, for example, dioxan to give a mixture of the lower melting and the higher melting geometrical isomers of 11 - hydroxy-10,5-(epoxymethano)-10,11-dihydro-5H-dibenzo[a,d]cyclohepten-13-one of Formula IX which may be separated, one from the other, by fractional crystallization. Either of these isomers of Formula IX is, in its turn, acylated with either a carboxylic acid anhydride or a carboxylic acid halide in the presence of a suitable basic catalyst such as, for example, pyridine to yield, after processing in a conventional manner the corresponding 11-acyloxy - 10,5 - (epoxymethano) - 10,11-dihydro-5H-dibenzo[a,d]cyclohepten-13-one of Formula VIIIb wherein R represents acyloxy. These processes are illustrated in the following formulae

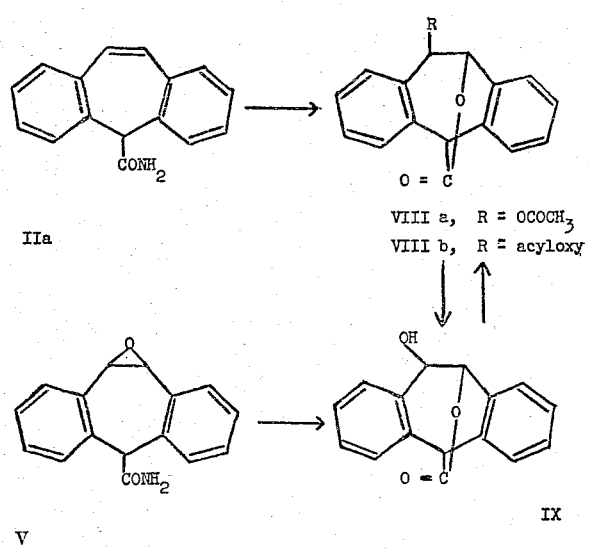

IIa
VIII a, R = OCOCH₃
VIII b, R = acyloxy
V
IX

The compounds of generic Formula I wherein R represents a lower alkoxy group may be prepared in the following manner. Thus, a solution of 10,11-epoxy-10,11-dihydro - 5H-dibenzo[a,d]cycloheptene-5-carboxamide of Formula V in an anhydrous lower alkanol is treated with a catalytic amount of a mineral acid, preferably sulphuric acid, and refluxed for a period of time of up to one day to yield, as the major product, the corresponding 11-alkoxy-10,5-(epoxymethano)-10,11-dihydro - 5H - dibenzo[a,d]cyclohepten-13-one of Formula X. The alkyl group in the alkanol used corresponds to the alkyl group in the alkoxy substituent, thus, when methanol is used as the solvent, the compound in which R represents the methoxy group, is obtained.

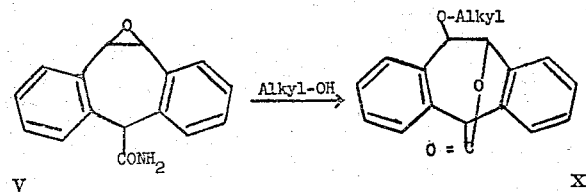

V
X

The compounds of generic Formula I wherein R represents halogen may be prepared in the following manner. Thus a solution of 10,11-epoxy-10,11-dihydro-5H-dibenzo[a,d]cycloheptene-5-carboxamide of Formula V in an inert solvent such as, for example, chloroform is saturated with a dry hydrogen halide such as, for example, hydrogen chloride and stored for a period of up to two days. Then the mixture is diluted with an alkanol, preferably ethanol, and refluxed for a period of up to two hours to yield, after processing in a conventional manner, the corresponding 11-halo-10,5-(epoxymethano)-10,11 - dihydro-5H-dibenzo[a,d]cyclohepten-13-one of Formula IVb as shown in the following formulae.

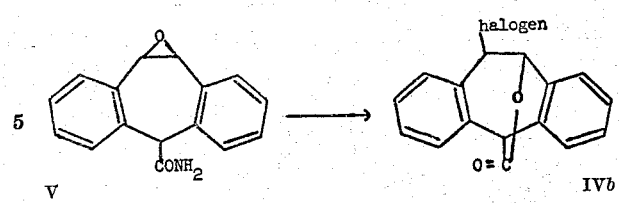

V
IVb

The starting materials for the compounds of this invention, that is the 5H-dibenzo[a,d]cycloheptene-5-carboxylic acid and 5-carboxamide of Formulae IIa and IIb may be prepared by known methods as described by M. A. Davis et al. in J. Med. Chem. 7, 88 (1964).

The compounds of this invention of Formulae IV, V, VI, VII, VIII, IX, and X inhibit the growth of *Trichomonas vaginalis* and are useful as trichomonicidal agents. As such, they may be formulated with suitable excipients in the form of vaginal suppositories or inserts containing from 50 to 250 mg. of the active ingredient, to be administered two to three times a day for periods of time of up to fourteen days.

Some of the compounds of this invention also possess marked activity upon the central nervous system. Thus, the compounds of Formula V possess anti-convulsant activity, especially against electro-shock to a very high degree, together with a low order of toxicity. The combination of the above properties makes the compounds useful as anti-convulsant agents. As such, they may be formulated into tablets or capsules with excipients such as lactose, starch, magnesium stearate, or magnesium silicate, each tablet or capsule containing from 5 to 100 mg. of the active ingredient. Such tablets or capsules may be administered from one to four times per day for prolonged periods of time.

The compounds of Formulae VI, IX and X also show anti-convulsant activity, especially against electro-shock to an important degree. They may be formulated and administered in a similar manner as described above.

It will be obvious to those skilled in the art, that a number of the compounds of this invention may be used as intermediates in the preparation of other compounds of this invention. The interrelationship between the various compounds of this invention, and how one compound may be prepared from another, are fully explained in the foregoing descriptions.

The following examples will be illustrative of this invention. All the compounds described in the following examples have been identified by elemental analysis.

EXAMPLE 1

*5-carboxamido-10,11-dibromo-10,11-dihydro-5H-dibenzo[a,d]cycloheptene* (IIIa)

To 5H-dibenzo[a,d]cycloheptene-5-carboxamide (47.0 g.) in chloroform (1000 ml.) bromine (10.3 ml.) in chloroform (100 ml.) is added dropwise over a period of 2 hours. The mixture is kept cold overnight and the solid is collected and washed with a little chloroform to give the title compound, M.P. 220° C.

EXAMPLE 2

*11-bromo-10,5-(epoxymethano)-10,11-dihydro-5H-dibenzo[a,d]cyclohepten-13-one* (IVa)

A mixture of 5-carboxamido-10,11-dibromo-10,11-dihydro-5H-dibenzo[a,d]cycloheptene obtained as described in Example 1 (15 g.) and ethanol (200 ml.) is refluxed for 2 hours. The resulting solution is evaporated and the water insoluble portion of the residue is crystallized from ethanol to yield the title compound, M.P. 160–161° C.

Alternatively, a solution of bromine (160 mg.) in chloroform (3 ml.) is added to a suspension of 5H-dibenzo[a,d]cycloheptene-5-carboxylic acid (236 mg.) in chloroform (10 ml.). The resulting straw-coloured solution is divided into two equal parts A and B. Each of these is evaporated to dryness and the residue from part A is treated with boiling ethanol for 2 hours. The ethanol is removed in vacuo and the water insoluble portion of the residue is crystallized from ethanol to yield the title compound as characterized above.

The residue from portion B is treated with boiling water for 2 hours. Crystallization of the resulting product from ethanol yields the title compound as characterized above.

As another alternative, a solution of 5-carboxamido-10,11-epoxy-10,11-dihydro-5H-dibenzo[a,d]cycloheptene (V, 1 g.), obtained as described in Example 3, in chloroform (20 ml.) is saturated with dry hydrogen bromide. The mixture is left at room temperature overnight, diluted with ethanol (80 ml.) and then refluxed for 2 hours. The resulting solution is evaporated to dryness and the residue crystallized from ethanol to yield the title compound as characterized above. If it is desired to obtain the corresponding 11-chloro derivative a solution of 5 - carboxamido - 10,11 - epoxy-10,11-dihydro-5H-dibenzo [a,d]cycloheptene (V, 1 g.), obtained as described in Example 3, in chloroform (20 ml.) is saturated with dry hydrogen chloride. The mixture is left at room temperature overnight, diluted with ethanol (80 ml.) and then refluxed for 2 hrs. The resulting solution is evaporated to dryness and the residue crystallized from ethanol to give 11-chloro-10,5-(epoxymethano)-10,11-dihydro-5H-dibenzo[a,d]cyclohepten-13-one (IVb) M.P. 171.5–172.5° C.

EXAMPLE 3

*5-carboxamido-10,11-epoxy-10,11-dihydro-5H-dibenzo[a,d]cycloheptene (V)*

Finely powdered 11-bromo-10,5-(epoxymethano)-10, 11-dihydro-5H-dibenzo[a,d]cyclohepten-13-one prepared as described in Example 2 (100 g.) is added during 40 minutes to liquid ammonia (1.1) with stirring. The mixture is stirred overnight allowing the ammonia to evaporate. The water insoluble portion of the residue is crystallized from ethanol to give the title compound as colourless needles, M.P. 191–193° C.

In the same manner, but starting with 11-chloro-10,5-(epoxymethano) - 10,11 - dihydro-5H-dibenzo[a,d]cyclohepten-13-one instead of the above 11-bromo derivative, the title compound is obtained as above.

EXAMPLE 4

*5-carboxamido-10-hydroxy 10,11-dihydro-5H-dibenzo[a,d]cycloheptene (VI)*

A solution of 5-carboxamido-10,11-epoxy-10,11-dihydro-5H-dibenzo[a,d]cycloheptene prepared as described in Example 3 in dry methanol (30 ml.) is hydrogenated in the presence of palladium-charcoal catalyst (100 mg., 10%). Reduction is complete after one mole of hydrogen has been absorbed.

Evaporation of the solution at low temperature, after removal of the catalyst, yields the title compound which is purified by careful crystallization from dioxan-hexane to M.P. 163–165° C.

A geometrical isomer of the above compound is prepared as follows: A solution of 5H-dibenzo[a,d]cycloheptene-5-carboxamide (5.0 g.) in dry tetrahydrofuran (200 ml.) is added dropwise to a stirred ice cold solution of diborane in tetrahydrofuran (80 ml., 2.5%). After 20 hours at room temperature water is cautiously added to the reaction mixture. The resulting suspension is then oxidized at 50° C. for 1 hour with sodium hydroxide solution (80 ml., 3 N) and hydrogen peroxide solution (20 ml., 30%). The mixture is cooled, saturated with potassium carbonate and then extracted with tetrahydrofuran. The residue from the dried evaporated extracts is crystallized from ethyl acetate and then chloroform or ethanol to yield a geometrical isomer of the title compound, M.P. 183–185° C.

EXAMPLE 5

*10,5-(epoxymethano)-10,11-dihydro-5H-dibenzo[a,d] cyclohepten-13-one (VII)*

A solution of 5-carboxamido-10-hydroxy-10,11-dihydro-5H-dibenzo[a,d]cycloheptene of M.P. 163–165° C., prepared as described in Example 4 (1.0 g.) in ethanol (20 ml.) is refluxed for 2 hours. Upon partial evaporation of the solution the title compound separates in stout needles, M.P. 169–170.5° C.

Alternatively, a mixture of 5-carboxamido-10-hydroxy-10,11-dihydro-5H-dibenzo[a,d]cycloheptene of M.P. 183–185° C. described in Example 4 (500 mg.) and 1 N hydrochloric acid is refluxed for one hour. The solid is partitioned between chloroform and saturated sodium bicarbonate solution, and the chloroform-soluble material, after evaporation of the solvent, is crystallized from ethanol to yield the title compound.

The bicarbonate-soluble material is isolated and crystallized from ethanol to give, as a minor by-product 5H-dibenzo[a,d]cycloheptene-5-carboxylic acid identical with an authentic sample.

EXAMPLE 6

*11-ethoxy-10,5-(epoxymethano)-10,11-dihydro-5H-dibenzo[a,d]cyclohepten-13-one*

A solution of 5-carboxamido-10,11-epoxy-10,11-dihydro-5H-dibenzo[a,d]cycloheptene obtained as described in Example 3 (2.0 g.) in anhydrous ethanol (20 ml.) containing two drops of concentrated sulphuric acid is refluxed for 6 hours. The solution is evaporated to near-dryness, diluted with water and the water insoluble material is collected and crystallized from ethanol to give the title compound, M.P. 191–193° C.

If it is desired to obtain the corresponding 11-methoxy derivative, a solution of 5-carboxamido-10,11-epoxy-10,11-dihydro-5H-dibenzo[a,d]cycloheptene obtained as described in Example 3 (2.0 g.) in anhydrous methanol (25 ml.) containing five drops of concentrated sulphuric acid is refluxed for 20 hours. The solution is evaporated to near-dryness, diluted with water and the water insoluble portion of the residue is crystallized from methanol to give the 11-methoxy-10,5-(epoxymethano)-10,11-dihydro - 5H-dibenzo[a,d]cyclohepten-13-one, M.P. 191–193° C.

In the same manner as described above, but using anhydrous n-butanol as the solvent, 11-n-butoxy-10,5-(epoxymethano) - 10,11 - dihydro-5H-dibenzo[a,d]cyclohepten-13-one is obtained.

EXAMPLE 7

*11-acetoxy-10,5-(epoxymethano)-10,11-dihydro-5H-dibenzo[a,d]cyclohepten-13-one (XII)*

5H-dibenzo[a,d]cycloheptene-5-carboxamide (25.0 g., 0.11 mole) is dissolved with heating in 500 ml. of acetic acid. The solution is stirred and cooled to 45° C. and silver acetate (41.0 g., 0.25 mole) is added. To this mixture is added, in portions, iodine (28.0 g., 0.11 mole). The mixture is then heated on the steam-bath for 3 hours and then cooled; an excess of sodium chloride is added and the mixture is filtered. The filtrate is concentrated to a gummy residue. This is stirred several times with water, dissolved in methylene chloride, washed several times with water, dried and concentrated to an orange oil. The oil crystallizes from absolute ethanol:hexane to give after recrystallization from ethanol, and title compound, with M.P. 145–146° C.

The same compound is also prepared by treating 11-hydroxy - 10,5 - (epoxymethano) - 10,11-dihydro-5H-dibenzo[a,d]cyclohepten-13-one, obtained as described in Example 8, with acetic anhydride in pyridine solution at room temperature, diluting with ice-water, and filtering and recrystallizing the resulting precipitate.

In the same manner as described above, but using propionic or butyric anhydrides in pyridine solution 11-propionoxy - 10,5 - (epoxymethano) - 10,11-dihydro-5H-dibenzo[a,d]cyclohepten - 13 - one or 11-butyryloxy-10,5-(epoxymethano) - 10,11 - dihydro-5H-dibenzo[a,d]cyclohepten-13-one are also obtained.

EXAMPLE 8

*11-hydroxy-10,5-(epoxymethano)-10,11-dihydro-5H-dibenzo[a,d]cyclohepten-13-one (X)*

11 - acetoxy - 10,5-(epoxymethano)-10,11-dihydro-5H-dibenzo[a,d]cyclohepten-13-one obtained as described in Example 7, (10.0 g., or 0.034 mole) is dissolved in methanol (200 ml.) with warming. Water (100 ml.) is added, followed by 5% sodium hydroxide (10 ml.) and the solution is kept overnight at room temperature. The methanol is removed by evaporation in vacuo, taking care to avoid overheating. The residue is dissolved by the addition of water (150 ml.). The solution is filtered to remove a small amount of insoluble material and the filtrate is cooled while hydrochloric acid is added. The precipitated lactone is collected, washed well with water and dried, yielding the title compound with M.P. 155–156° C.

Two geometrical isomers of the title compound, viz., the isomer with M.P. 155–156° C. together with an isomer with M.P. 188.5–190° C. may be obtained together as follows:

To a well-stirred solution of 10,11-epoxy-10,11-dihydro-5H-dibenzo[a,d]cycloheptene-5-carboxamide obtained as described in Example 3 (80.0 g., 0.32 mole) in 700 ml. of dioxane is added 1000 ml. of 1.0 N sulfuric acid. The solution is kept at room temperature for 2 hours. Dioxane is removed in vacuo, the aqueous phase diluted with water, extracted twice with methylene chloride, washed three times with water, dried and concentrated to a yellow oil, which is crystallized from absolute alcohol:hexane; filtration at room temperature yields the title compound with M.P. 188.5–190° C. Upon cooling the mother liquors from the above product, a crystalline precipitate is obtained from which the geometrical isomer of the title compound with M.P. 155–156° C. is obtained by treatment with concentrated ammonia followed by heating on the steam bath for one hour.

EXAMPLE 9

*11-chloroacetoxy-10,5-(epoxymethano)-10,11-dihydro-5H-dibenzo[a,d]cyclohepten-13-one*

The high-melting geometrical isomer of 11-hydroxy-10,5 - (epoxymethano) - 10,11-dihydro-5H-dibenzo[a,d]cyclohepten-13-one obtained as described in Example 8 (7.0 g., 0.03 mole) is dissolved in a mixture of dry dioxan (12 ml.) and dry benzene (70 ml.). To this solution is added chloroacetyl chloride (3.2 g., 0.03 mole) and dry pyridine (2.24 g., 0.03 mole). The solution is kept at room temperature overnight. The mixture is diluted with water and the organic phase is collected, washed with water, dried and evaporated. The residue is crystallized from ethanol to give the title compound with M.P. 156–157° C.

EXAMPLE 10

*11-p-nitrobenzoyloxy-10,5-(epoxymethano)-10,11-dihydro-5H-dibenzo[a,d]cyclohepten-13-one*

The high-melting geometrical isomer of 11-hydroxy-10,5 - (epoxymethano) - 10,11-dihydro-5H-dibenzo[a,d]cyclohepten-13-one obtained as described in Example 8, (1.0 g., 0.004 mole) is dissolved in a mixture of dry dioxan (12 ml.) and dry benzene (15 ml.). To this solution is added p-nitrobenzoyl chloride (0.76 g., 0.004 mole) and pyridine (0.32 g., 0.004 mole). The mixture is kept at room temperature for 3 hours before it is diluted with water. The organic layer is collected, water washed and then dried and evaporated. The residual oil is crystallized from acetonitrile to give the title compound with M.P. 223–225° C.

EXAMPLE 11

*11-p-aminobenzoyloxy-10,5-(epoxymethano)-10,11-dihydro-5H-dibenzo[a,d]cyclohepten-13-one*

A solution of 11-p-nitrobenzoyloxy-10,5-(epoxymethano) - 10,11 - dihydro - 5H-dibenzo[a,d]cyclohepten-13-one obtained as described in Example 10 (5.3 g., 0.013 mole) in dioxan (100 ml.) is hydrogenated in the presence of a 10% palladium on charcoal catalyst (200 mg.) at a temperature of 45° C. and a pressure of 3 atmospheres for 3.5 hours. The catalyst is separated and the filtrate is evaporated. The residue is triturated with ether and the ether insoluble material is crystallized from ethanol to give the title product with M.P. 213–215° C.

We claim:
1. A compound of the formula

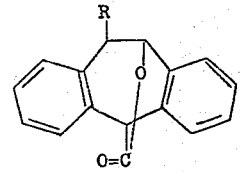

wherein R is a radical selected from the group consisting of hydrogen, halogen, hydroxy, lower alkoxy, lower alkanoyloxy, chloroacetoxy, p-nitrobenzoyloxy and p-aminobenzoyloxy.

2. 10,5 - (epoxymethano)-10,11-dihydro-5H-dibenzo-[a,d]cyclohepten-13-one, as claimed in claim 1.

3. 11 - bromo - 10,5 - (epoxymethano) - 10,11-dihydro-5H-dibenzo[a,d]cyclohepten-13-one, as claimed in claimed 1.

4. 11 - chloro - 10,5 - (epoxymethano) - 10,11 - dihydro-5H-dibenzo[a,d]cyclohepten-13-one, as claimed in claim 1.

5. 11 - hydroxy - 10,5 - (epoxymethano) - 10,11 - dihydro-5H-dibenzo[a,d]cyclohepten-13-one, as claimed in claim 1.

6. 11 - ethoxy - 10,5 - (epoxymethano) - 10,11 - dihydro-5H-dibenzo[a,d]cyclohepten-13-one, as claimed in claim 1.

7. 11 - methoxy - 10,5 - (epoxymethano) - 10,1 - dihydro-5H-dibenzo[a,d]cyclohepten-13-one, as claimed in claim 1.

8. 11 - n-butoxy-10,5 -(epoxymethano) - 10,11 - dihydro-5H-dibenzo[a,d]cyclohepten-13-one, as claimed in claim 1.

9. 11 - acetoxy - 10,5 - (epoxymethano) - 10,11 - dihydro-5H-dibenzo[a,d]cyclohepten-13-one, as claimed in claim 1.

10. 11 - propionoxy - 10,5 - (epoxymethano) - 10,11-dihydro-5H-dibenzo[a,d]cyclohepten-13-one, as claimed in claim 1.

11. 11 - butyryloxy - 10,5 - (epoxymethano) - 10,11-dihydro-5H-dibenzo[a,d]cyclohepten-13-one, as claimed in claim 1.

12. 11 - chloroacetoxy - 10,5 - (epoxymethano)-10,11-dihydro-5H-dibenzo[a,d]cyclohepten-13-one, as claimed in claim 1.

13. 11 - p - nitrobenzoyloxy - 10,5 - (epoxymethano)-10,11 - dihydro - 5H - dibenzo[a,d]cyclohepten - 13 - one, as claimed in claim 1.

14. 11 - p - aminobenzoyloxy - 10,5 - (epoxymethano)-10,11 - dihydro - 5H - dibenzo[a,d]cyclohepten - 13 - one, as claimed in claim 1.

References Cited

UNITED STATES PATENTS 2,750,371   6/1956   Subluskey _____ 260—343.2

JAMES A. PATTEN, *Primary Examiner.*